United States Patent
Segev et al.

(10) Patent No.: US 12,210,594 B2
(45) Date of Patent: Jan. 28, 2025

(54) CLUSTERING-BASED DATA OBJECT CLASSIFICATION

(71) Applicant: Cyera, Ltd., Tel Aviv (IL)

(72) Inventors: Yotam Segev, New York, NY (US); Itamar Bar-Ilan, Tel Aviv (IL); Yonatan Itai, Tel Aviv (IL); Shiran Bareli, Tel Aviv (IL); Guye Vered, Rishon Letzion (IL); Tomer Mesika, Tel Aviv (IL); Itay Fainshtein, Tel Aviv (IL); Ofir Talmor, Tel Aviv (IL)

(73) Assignee: Cyera, Ltd., Tel Aviv (IL)

( * ) Notice: Subject to any disclaimer, the term of this patent is extended or adjusted under 35 U.S.C. 154(b) by 0 days.

(21) Appl. No.: 18/308,204

(22) Filed: Apr. 27, 2023

(65) Prior Publication Data

US 2024/0362301 A1 Oct. 31, 2024

(51) Int. Cl.
*G06F 18/2415* (2023.01)

(52) U.S. Cl.
CPC .................. *G06F 18/2415* (2023.01)

(58) Field of Classification Search
None
See application file for complete search history.

(56) References Cited

U.S. PATENT DOCUMENTS

| | | |
|---|---|---|
| 7,813,561 B2 | 10/2010 | Jia et al. |
| 9,165,051 B2 | 10/2015 | Masud et al. |
| 9,753,906 B2 | 9/2017 | Partridge et al. |
| 10,769,503 B1 | 9/2020 | Buhler et al. |
| 11,106,703 B1 | 8/2021 | Enuka et al. |
| 11,120,220 B2 | 9/2021 | Chaudhri et al. |
| 11,146,573 B2 * | 10/2021 | Shtar ..................... H04L 67/535 |
| 11,750,627 B2 * | 9/2023 | Shtar ..................... H04L 63/105 726/23 |
| 11,868,852 B1 * | 1/2024 | Watson .................. G06N 20/00 |
| 11,899,132 B2 * | 2/2024 | John Wilson ......... G01S 13/931 |
| 11,928,425 B2 * | 3/2024 | Eshghi .................. G06F 40/174 |

(Continued)

FOREIGN PATENT DOCUMENTS

| | | |
|---|---|---|
| CN | 115525759 A | 12/2022 |
| EP | 1057269 A1 | 12/2000 |

OTHER PUBLICATIONS

International Search Report for PCT/IB2024/054101, dated Jul. 14, 2024. Searching Authority, Israel Patent Office, Jerusalem, Israel.

(Continued)

*Primary Examiner* — Kim T Nguyen
(74) *Attorney, Agent, or Firm* — M&B IP Analysts, LLC

(57) ABSTRACT

Techniques for data classification using clustering. A method includes replacing a plurality of portions of metadata for a plurality of data objects with a plurality of replacement characters in order to generate a plurality of replaced strings; clustering the plurality of data objects into a plurality of clusters based on commonalities between the plurality of replaced strings of data objects of the plurality of data objects; classifying a subset of the data objects in each cluster into at least one class; and aggregating classes within at least one cluster of the plurality of clusters, wherein aggregating classes within each of the at least one cluster includes applying the at least one class for the subset of the data objects in each cluster to each other data object within the cluster.

23 Claims, 6 Drawing Sheets

(56) References Cited

U.S. PATENT DOCUMENTS

| | | | |
|---|---|---|---|
| 11,954,605 B2* | 4/2024 | Portisch | G06F 16/367 |
| 2012/0117474 A1* | 5/2012 | Miki | G06F 16/51 |
| | | | 715/732 |
| 2012/0265761 A1* | 10/2012 | Atsmon | G06F 16/51 |
| | | | 707/E17.046 |
| 2016/0275173 A1 | 9/2016 | Gomes et al. | |
| 2018/0322404 A1* | 11/2018 | Wang | G06N 5/04 |
| 2019/0158513 A1* | 5/2019 | Shtar | G06F 21/552 |
| 2020/0311414 A1 | 10/2020 | Enuka et al. | |
| 2021/0400062 A1* | 12/2021 | Shtar | H04L 63/1416 |
| 2022/0101151 A1* | 3/2022 | Portisch | G06F 16/212 |
| 2023/0107263 A1* | 4/2023 | Kashiwagi | G06F 18/211 |
| | | | 600/410 |
| 2023/0359706 A1* | 11/2023 | Yang | G06F 18/2415 |
| 2023/0417912 A1* | 12/2023 | Xu | G01S 17/66 |
| 2024/0062514 A1* | 2/2024 | Ling | G06V 10/82 |
| 2024/0126918 A1* | 4/2024 | Segev | G06F 21/6245 |
| 2024/0134883 A1* | 4/2024 | Buchmann | G06F 16/285 |
| 2024/0232227 A9* | 7/2024 | Buchmann | G06F 16/285 |

OTHER PUBLICATIONS

Written Opinion of the Searching Authority for PCT/IB2024/054101, dated Jul. 14, 2024. Searching Authority, Israel Patent Office, Jerusalem, Israel.

\* cited by examiner

CLUSTERING-BASED DATA OBJECT CLASSIFICATION

TECHNICAL FIELD

The present disclosure relates generally to cloud computing data management, and more specifically to classifying data stored in data stores of cloud computing environments using clustering techniques.

BACKGROUND

Knowing the locations of sensitive or potentially sensitive data within a cloud computing environment is very useful for identifying and prioritizing potential flaws in security of the cloud computing environment. To this end, the ability to distinguish among different types of data is particularly relevant for defending cloud environments against cybersecurity threats. Distinguishing among different types of data may include performing classification in order to identify classes in a certain data, for example, a credit card number written in a file, or to identify the purpose of the data, for example, that the file is an invoice document. Thus, how to classify data, and more specifically how to classify data in large environments with hundreds of thousands or millions or even billions of data objects (for example, files), presents a significant challenge to operators of cloud computing environments.

In large scale computing environments, the amount of data objects to be classified is often so great that it is impractical to analyze all of it in order to derive classifications, particularly when classifications are needed in real-time. Existing solutions might include clustering the data objects and sampling data objects from their cluster. Data objects may be sampled with the goal of obtaining data samples that are representative of their entire clusters (the surrounding data objects) such that the classification of a given data sample may be assumed to be accurate for its respective surrounding data (the entire cluster). Techniques for sampling which will yield such accurate classification results and, in particular, techniques which may allow for minimizing the number of samples while allowing for accurate classification in real-time are therefore highly desirable.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for data classification using clustering. The method comprises: replacing a plurality of portions of metadata for a plurality of data objects with a plurality of replacement characters in order to generate a plurality of replaced strings; clustering the plurality of data objects into a plurality of clusters based on commonalities between the plurality of replaced strings of data objects of the plurality of data objects; classifying a subset of the data objects in each cluster into at least one class; and aggregating classes within at least one cluster of the plurality of clusters, wherein aggregating classes within each of the at least one cluster includes applying the at least one class for the subset of the data objects in each cluster to each other data object within the cluster.

Certain embodiments disclosed herein also include a non-transitory computer readable medium having stored thereon causing a processing circuitry to execute a process, the process comprising: replacing a plurality of portions of metadata for a plurality of data objects with a plurality of replacement characters in order to generate a plurality of replaced strings; clustering the plurality of data objects into a plurality of clusters based on commonalities between the plurality of replaced strings of data objects of the plurality of data objects; classifying a subset of the data objects in each cluster into at least one class; and aggregating classes within at least one cluster of the plurality of clusters, wherein aggregating classes within each of the at least one cluster includes applying the at least one class for the subset of the data objects in each cluster to each other data object within the cluster.

Certain embodiments disclosed herein also include a system for data classification. The system comprises: a processing circuitry; and a memory, the memory containing instructions that, when executed by the processing circuitry, configure the system to: replace a plurality of portions of metadata for a plurality of data objects with a plurality of replacement characters in order to generate a plurality of replaced strings; cluster the plurality of data objects into a plurality of clusters based on commonalities between the plurality of replaced strings of data objects of the plurality of data objects; classify a subset of the data objects in each cluster into at least one class; and aggregate classes within at least one cluster of the plurality of clusters, wherein aggregating classes within each of the at least one cluster includes applying the at least one class for the subset of the data objects in each cluster to each other data object within the cluster.

Certain embodiments disclosed herein include the method, non-transitory computer readable medium, or system noted above, wherein the metadata for each data object includes a plurality of metadata parameters, wherein the plurality of data objects is clustered into the plurality of clusters based on the plurality of metadata parameters of each data object.

Certain embodiments disclosed herein include the method, non-transitory computer readable medium, or system noted above, wherein the plurality of data objects is clustered over a plurality of iterations, wherein at least one iteration of the plurality of iterations includes comparing the sets of metadata parameters between clusters.

Certain embodiments disclosed herein include the method, non-transitory computer readable medium, or system noted above, wherein the at least one iteration further includes replacing at least one metadata parameter of at least one of the plurality of data objects, wherein subsequent iterations of the plurality of iterations are performed based on replaced metadata parameters from prior iterations of the plurality of iterations.

Certain embodiments disclosed herein include the method, non-transitory computer readable medium, or system noted above, wherein each of at least one first replaced portion of the replaced plurality of portions is a numerical value, wherein each of the at least one first replaced portion is replaced with a respective range including the numerical value.

Certain embodiments disclosed herein include the method, non-transitory computer readable medium, or system noted above, wherein each of at least one second replaced portion of the replaced plurality of portions is a textual parameter, wherein each of the at least one second replaced portion demonstrates a pattern and is replaced with a set of predefined replacement characters that corresponds to the pattern.

Certain embodiments disclosed herein include the method, non-transitory computer readable medium, or system noted above, wherein each of at least one third replaced portion of the replaced plurality of portions is a textual parameter, wherein the process of the method or the process the system is configured to perform further comprises splitting each of the at least one third replaced portion into a plurality of substrings, wherein the plurality of data objects is clustered based further on each plurality of substrings.

Certain embodiments disclosed herein include the method, non-transitory computer readable medium, or system noted above, wherein the process of the method or the process the system is configured to perform further comprises filtering out at least one substring from the plurality of substrings in order to yield at least one filtered of substrings, wherein the clustering is performed based further on the at least one filtered list of substrings.

Certain embodiments disclosed herein include the method, non-transitory computer readable medium, or system noted above, wherein the process of the method or the process the system is configured to perform further comprises optimizing the plurality of clusters based on at least one random sequence identified in the metadata of the plurality of data objects, wherein each random sequence is a string of characters having a length over a predetermined threshold which does not meet at least one replacement criterion.

Certain embodiments disclosed herein include the method, non-transitory computer readable medium, or system noted above, wherein the process of the method or the process the system is configured to perform further comprises optimizing the plurality of clusters based on cluster size by identifying at least one cluster having a cluster size below a threshold and replacing at least one textual parameter of each cluster having a cluster size below a threshold with a respective list of words identified within the textual parameter.

Certain embodiments disclosed herein include the method, non-transitory computer readable medium, or system noted above, wherein the process of the method or the process the system is configured to perform further comprises sampling each of the plurality of clusters in order to obtain a plurality of samples, wherein each sample is one of the data objects in one of the plurality of clusters; and determining the at least one cluster for which classes are to be aggregated based on the plurality of samples.

Certain embodiments disclosed herein include the method, non-transitory computer readable medium, or system noted above, wherein the process of the method or the process the system is configured to perform further comprises performing at least one action to secure a computing environment including the plurality of data objects based on the classes determined for the plurality of data objects.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1A:
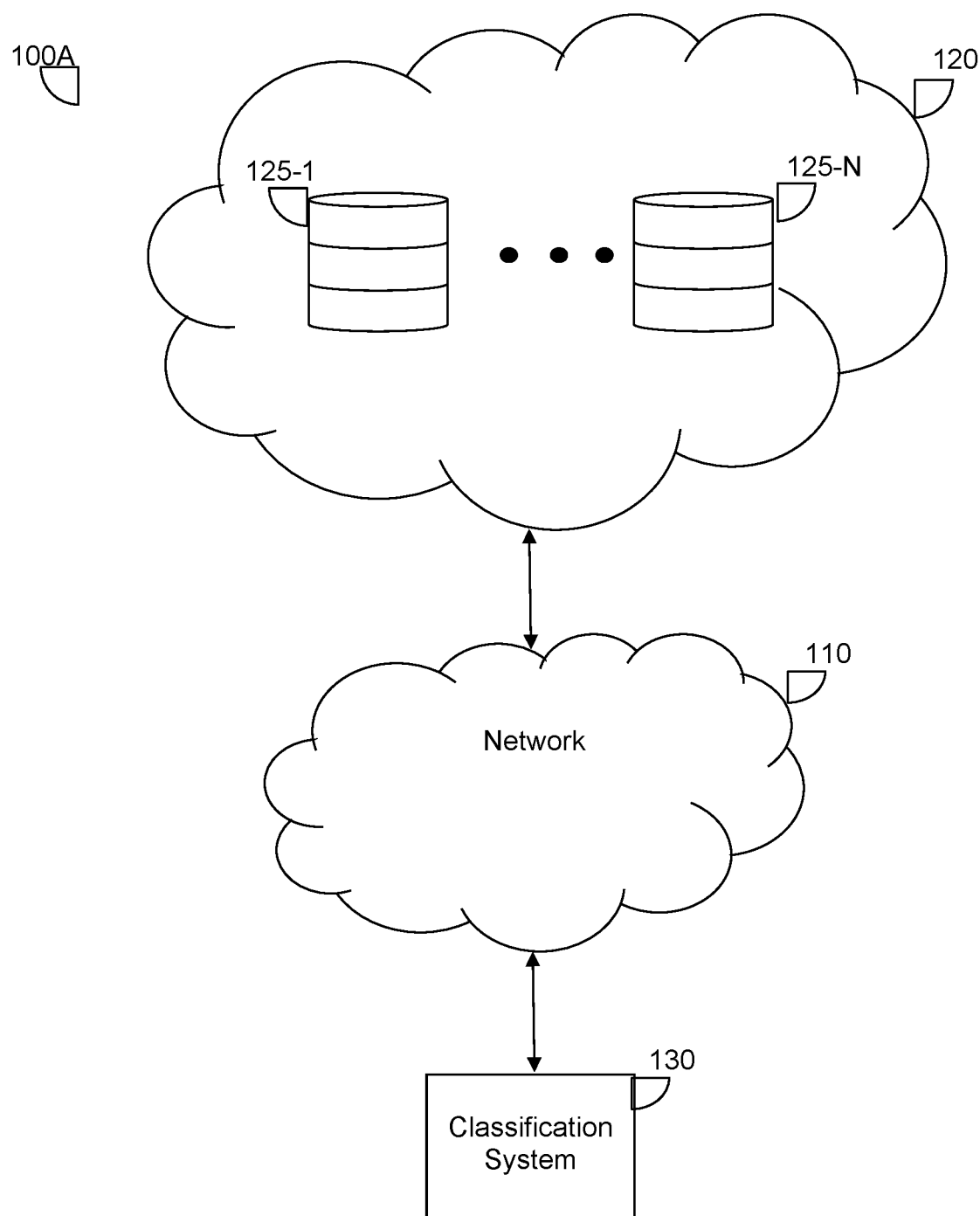
FIGS. 1A-B are network diagrams utilized to describe various disclosed embodiments.

The various disclosed embodiments include techniques for data classification using clustering. The disclosed embodiments can be utilized in order to, among other things, identify sensitive data, particularly in large environments with significant numbers of data objects. More specifically, the disclosed embodiments provide techniques for effectively and accurately clustering data objects by their metadata parameters, which allows for improving efficiency of classification while maintaining the accuracy of classification results.

In an embodiment, data objects to be classified are clustered using a process which identifies appropriate clusters to sample from. The identified clusters are sampled from, and the samples taken from each of the clusters are classified. Results of the classification are utilized to identify true clusters (clusters that have common classifications according to their samples' classifications) and aggregated across the entire set of objects within the cluster for each cluster identified as a true cluster. Clusters which are not identified as true clusters may be further clustered until they yield true clusters or until the resulting clusters fail one or more threshold requirements. The classifications may be utilized to secure a cloud environment in which the data is stored, for example, based on a sensitivity classification for the data.

In an embodiment, the clustering includes obtaining metadata parameters of data objects. Certain values within the metadata parameters of the data objects are replaced with a range of values, where the range of values is a range including the original value. The resulting replaced metadata parameters represent the initial clusters of the respective data objects. This process may be performed for each data object. Data objects can be grouped into clusters based on replaced metadata parameters, for example such that data objects having the same replaced metadata parameters are grouped into the same cluster.

The metadata parameters of the data objects may include, but are not limited to, file size, creation data, file path, file name (e.g., " . . . \documents\example.txt"), accessibility state, encryption state, combinations thereof, portions thereof, and the like. In an embodiment, the replacement of the metadata parameters in order to create the replaced metadata parameters includes replacing at least a portion of each of the metadata parameters with one or more replacement parameters. The replacement parameters may be predefined and may each correspond to a respective type of data (e.g., numerical parameters, textual parameters), subtype of data (e.g., file size, creation data, file path, etc.), both, and the like. The specific replacement parameter to be used for replacing each portion of metadata to be replaced may be determined, for example, based on a value (e.g., a numerical value, a textual value, a combination thereof, etc.) of the portion of the metadata parameters to be replaced.

In a further embodiment, the predefined replacement parameters may include predefined ranges. The predefined range may be assigned, for example, depending on the value of the portion of the metadata parameter being replaced. More specifically, portions of metadata parameters indicating a numerical parameter of the metadata may be replaced with ranges including a value of that numerical parameter. As a non-limiting example, potential predefined ranges for file size could be 1024-2048 or 2048-4096 bytes, and a file size equal to 1223 bytes would fall into the range 1024-2048 such that a portion of a metadata parameter indicating a value for file size of 1223 bytes would be replaced with the range 1024-2048.

Alternatively or additionally, the portions of the metadata parameters to be replaced may include textual parameters of the metadata (e.g., file path, name, etc.). Such textual parameters may be replaced with new parameters that represent one or more patterns corresponding to the value of the original textual parameter of the given data object (e.g., patterns demonstrated across multiple other data objects which are also reflected in the value of the given data object).

To this end, in some further embodiments, one or more predefined patterns may be identified as part of a textual parameter of a set of metadata parameters, and each predefined pattern may be replaced with a corresponding predefined replacement parameter that is at least partially textual. In yet a further embodiment, such a textual replacement parameter may be a replacement parameter including one or more replacement characters used to replace a predefined textual pattern identified in the textual metadata pattern. The replaced textual parameters are split into substrings based on one or more separators (such as, but not limited to, spaces, tabs, hyphens, slashes, sequences of letters that each start with a capital letter and followed by lowercase letters, etc.). The resulting list of separable strings is compared against a dictionary (e.g., a dictionary containing a list of known words in English) in order to identify words whose grammatical category is either noun or verb and filtering out any substrings which do not contain words which are indicated in the dictionary as being either a noun or a verb.

In accordance with various disclosed embodiments, optimization may be performed with respect to the replaced metadata parameters and the clusters. More specifically, the optimization may be performed in order to unite at least some of the clusters by combining metadata parameters within multiple clusters into a united cluster, thereby reducing the number of clusters to be processed later.

The disclosed embodiments further include techniques for determining whether a given cluster is a true cluster such that no further classifications for a portion of the cluster can accurately be enforced on the entire cluster. Data objects are taken as samples from each cluster, and a classification from a sample in each true cluster is enforced on the entire cluster. Moreover, some of the classifications may be generalized classifications which generalize specific types of data into higher level types. By enforcing the classifications on the entire clusters only for true clusters as described herein, the classification process can be performed more efficiently (i.e., by reducing the number of objects which need to be individually classified) while maintaining accuracy by enforcing classifications based on other data objects in the same cluster which are likely to have the same classifications. Moreover, if no clustering can be performed for a data set (e.g., when clustering into a first set of potential clusters from among the data set fails to yield any classifications that can be performed on those clusters), the data set may be classified as a true cluster belonging to an "unclassified" classification.

In this regard, it is noted that there are many challenges in classifying large data sets. Some of these challenges come in the form of limited resources, particularly, time, storage, and memory. Other challenges relate to unclear data which may be difficult to classify correctly (e.g., false positives) if analyzed individually. Additionally, a significant challenge in clustering the data objects is determining an appropriate number of groups or clusters, particularly when the data objects are stored in an environment that is unfamiliar.

Some existing techniques could be leveraged to address the challenge of clustering unknown data sets, but these techniques are not efficient or practical when applied to large scale data. For example, an algorithm that compares each metadata parameter of each data object to the other could be utilized, but this approach would run in polynomial time and space complexity. As the size of the data set increases, this option becomes inefficient. For millions of data objects or more, this approach will be entirely unfeasible. Some more efficient existing techniques require knowing the number of clusters in advance, which is unfeasible for an unfamiliar cloud environment.

The disclosed embodiments provide techniques which address these challenges and others. More specifically, as noted above, the disclosed embodiments provide techniques for creating the initial clusters in real-time, on linear time complexity, and on constant space complexity; for optimizing the initial clusters on log linear time complexity and linear space complexity; and for iteratively running those processes again up to a predefined number of times. The whole clustering process yields clusters likely to contain data objects having the same classifications in a minimal number of iterations as well as for accurately aggregating classifications within clusters in order to reduce the number of data objects that are read and classified.

Additionally, although techniques for clustering and sampling exist, there is no solution for clustering and sampling of a great amount of data objects in real-time (without having to have an entire list of data objects in advance). The disclosed embodiments provide techniques which allow for clustering and sampling large numbers of data objects in real time without requiring such a list, and with less than polynomial time and space complexity than existing solutions as applied to comparable data.

With respect to unclear data, the aggregation in accordance with various disclosed embodiments may work under the assumption that a cluster is a true cluster and check if differences in the samples' classifications (if they exist) are likely to be due to false positives of the classification process. If so, some classifications might be marked as false positives (by the statistical procedure) and would not be aggregated to the whole cluster. It has been identified that such a statistical procedure may be helpful in automatically validating the classifications for unclear data. In regard to determining the appropriate number of clusters, the disclosed embodiments provided techniques that do not require knowing this number in advance.

FIG. 1A shows an example network diagram 100A utilized to describe various disclosed embodiments. In the example network diagram 100, a classification system 130 communicates with components in a cloud environment 120 via a network 110. The network 110 may be, but is not limited to, a wireless, cellular or wired network, a local area network (LAN), a wide area network (WAN), a metro area network (MAN), the Internet, the worldwide web (WWW), similar networks, and any combination thereof.

As shown in FIG. 1A, the cloud environment 120 includes various disks 125-1 through 125-N (hereinafter referred to individually as a disk 125 or collectively as disks 125 for simplicity). The disks 125 may be, but are not limited to, hard drive disks, virtual disks, and the like. Some of the disks 125 may contain data stores (not depicted in FIG. 1A) and therefore data in such data stores may need to be classified in order to provide certain security features to protect those data stores. To this end, the classification system 130 is configured to cluster data from the disks 125, and to sample from among the clustered data. The classification system 130 is further configured to classify the samples.

Figure 1B:
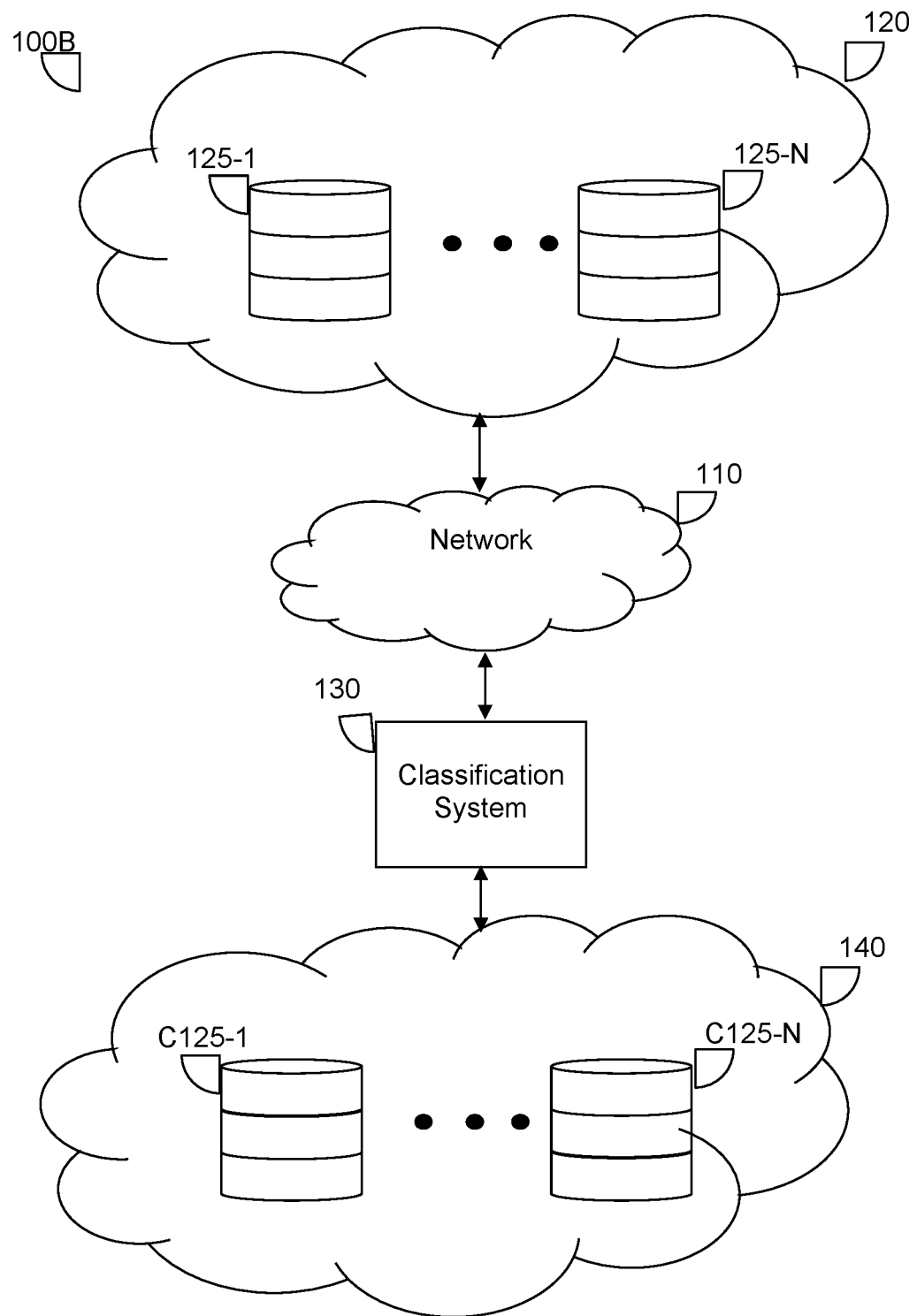

FIG. 1B further shows disk copies C125-1 through C125-N (hereinafter referred to as disk copies C125 for simplicity) that are copies of respective disks 125 which may be created in order to facilitate clustering and classification in accordance with some embodiments. The disk copies C125 are created and connected to engines (not shown) run via the classification system 130, for example via one or more virtual machines running on the classification system 130. Example techniques for copying disks which may be used to more efficiently scan disks (and, consequently, more efficiently classify data identified via such scans) are described further in U.S. patent application Ser. No. 17/647,899, assigned to the common assignee, the contents of which are hereby incorporated by reference.

It should be noted that a single classification system 130 is depicted for simplicity purposes, but that classification systems may be utilized without departing from the scope of the disclosure. Each classification system may run one or more virtual machines, each virtual machine being configured with one or more engines as described herein.

Figure 2:
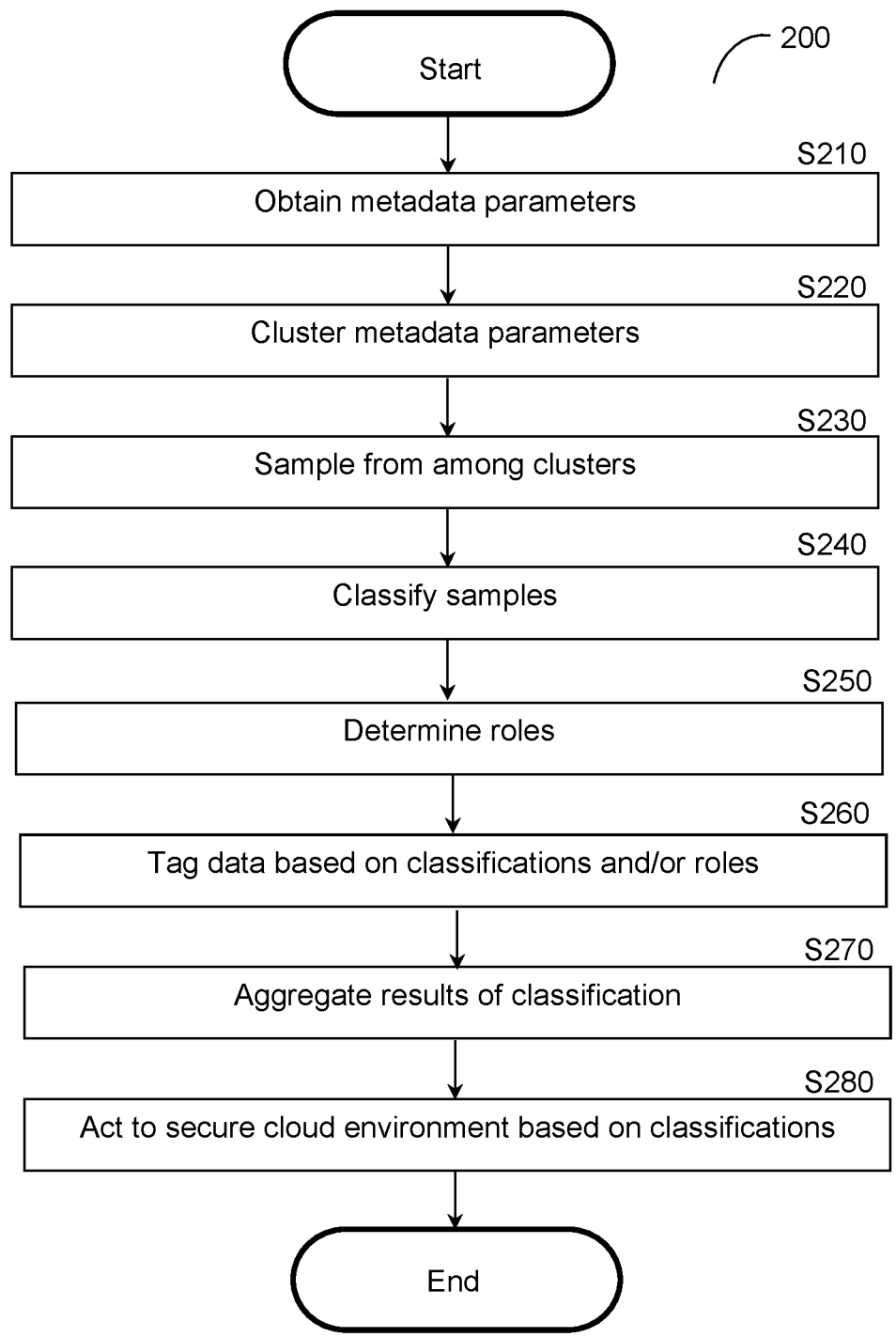
FIG. 2 is a flowchart illustrating a method for data object classification using clustering according to an embodiment.

FIG. 2 is an example flowchart 200 illustrating a method for data classification using clustering according to an embodiment. In an embodiment, the method is performed by the classification system 130, FIG. 1.

At S210, metadata parameters of data objects to be classified are obtained. The data objects' metadata parameters are obtained from components in a cloud computing environment (also referred to as the cloud environment) and, in particular, components such as data stores deployed in the cloud environment (e.g., data stores stored in the disks 125 or the disk copies C125, FIGS. 1A-B).

At S220, the data objects' metadata parameters are clustered. In an embodiment, the clustering is at least partially performed based on metadata included among the data. In a further embodiment, initial clustering may be performed based on the metadata, and the initial clusters are subsequently processed and may be split or joined into further clusters in order to yield a set of optimized clusters which are likely to reflect the optimal clustering scheme. To this end, in an embodiment, the clustering is performed as described further below with respect to FIG. 3.

At S230, samples are taken from among the clusters. In an embodiment, a predetermined number of samples are taken randomly such that the samples collectively represent well the whole set of data objects in the same cluster.

At S240, one or more classifiers are applied in order to classify the samples. The classifiers are configured to output one or more classifications for each of the samples such as, but not limited to, data classes, sensitivity classifications (e.g., sensitive, not sensitive, degrees of sensitivity, etc.), specific types of data, roles of data (e.g., roles with respect to the type of owner or other entity represented by the data such as customer or employee), combinations thereof, and the like.

In some embodiments, S240 includes performing at least a portion of the classification process described further in U.S. patent application Ser. No. 18/046,204, assigned to the common assignee, the contents of which are hereby incorporated by reference. In such embodiments, a heuristic process, a machine learning process, or both, may be utilized as part of the classification process. The heuristic process may include, but is not limited to, applying a truth table including columns representing a set of heuristic factors as well as a column including score outputs. The machine learning process may include, but is not limited to, applying one or more classifier models trained to output classes for samples based on keywords extracted from those samples.

At optional S250, roles of the data may be determined in order to further refine the classifications determined at S240. The determined roles may be added to the classifications for the same data, thereby improving the granularity of each classification to which a role is added.

In an embodiment, the determined roles at least include roles indicating whether the data is owned by a customer or by an employee. In other words, the determined role for a given portion of data may be indicative of the role the data serves with respect to the type of entity who owns the data. In this regard, it is noted that cybersecurity requirements according to various laws, regulations, and practices may pose different requirements depending on who owns the data. For example, consumer protection laws and best practices may differ from employee protection laws and best practices. Accordingly, determining roles for the data with respect to data ownership may further improve the granularity of the classification beyond simply identifying the type of data, which in turn allows for more accurately determining which corrective actions may need to be taken with respect to data and/or how to prioritize those corrective actions.

In an embodiment, S250 may include determining one or more new roles based on the data. The new roles are previously unidentified roles which may be unique to the source of the data. In this regard, it is noted that certain providers of cloud environments or of components in cloud environments may have their own proprietary data classes which may not be detected solely using existing classifications. In particular, such providers may have their own unique categories of data types represented by respective roles which are initially unknown. To this end, new roles may be determined using the data.

In a further embodiment, in order to determine new roles, S250 may include collecting column names of columns among the data and extracting repeating terms among those column names. The repeating terms may be identical terms or terms sharing, for example, a common prefix or suffix. To this end, at least some of the repeating terms may be identified using a dictionary of related terms (e.g., terms which are synonymous, share a prefix, share a suffix, or are otherwise conceptually related). Determining the new roles may further include analyzing fields of data within each column with a repeating term in order to further verify that the repeating terms of the columns indicate that the content of each column has a similar role to other columns with the repeating terms.

As a non-limiting example for creating a new role using repeating terms, the terms "donor" and "donation" may appear multiple times among column names of columns in the data. In columns with the term "donor" or "donation" as the column name, fields such as "donor ID," "donation amount," and "donor name" are extracted. The extracted fields are analyzed in order to verify that the fields contain terms which are also repeating terms as compared to each other and to the column names. Accordingly, a new role is determined and created as a role "Donor/Donation."

At optional S260, the data may be tagged using the classifications, roles, or both. The tags may be used for future reference in order to reduce or otherwise avoid the need to reclassify data, for example when the cloud environment changes. In this regard, it is noted that the structure of a cloud environment may change, and components within the cloud environment may also change such that they store different kinds of data over time. Maintaining tags for previously classified data allows for reducing the amount of classification processing which is required as well as allowing for analyzing correctness of cloud environment configurations more quickly than would happen if data needs to be reclassified every time the cloud environment needs to be checked for cybersecurity purposes. In an embodiment, the tags are computed using one-way functions (e.g., hash functions) such that the raw data cannot be reconstructed using the tags.

At S270, results of the classification performed at any of S240 through S260 are aggregated. In an embodiment, the aggregation may be performed as described further below with respect to FIG. 4. More specifically, S270 may include determining whether each cluster is a true cluster, where a true cluster is a cluster in which all samples among the cluster have one or more comparable classifications. Moreover, at least some of the classifications may be generalized classifications defined based on format, content, data types, or other aspects of data among the samples.

In some embodiments, when a cluster is determined as a false cluster during the aggregation process (i.e., the cluster is not determined to be a true cluster), an additional iteration of clustering may be performed among that false cluster. That additional iteration may include performing any or all of the steps S210 through S260 again for the false cluster. In a further embodiment, additional iterations of clustering may be performed until the results of reclustering yield a true cluster or a predetermined number of iterations has been performed.

At S280, one or more actions are taken to secure the cloud environment using the determined classifications. In an embodiment, S280 includes modifying one or more components in the cloud environment based on the data classification of data stored in each component. More specifically, each component may be modified to meet one or more cybersecurity requirements with respect to, for example but not limited to, the data classification of the data stored in the component or other components of the data.

In another embodiment, S280 may include monitoring behavior of components in the cloud environment in order to detect abnormal behaviors as potential cybersecurity threats and performing mitigation actions with respect to the detected abnormal behaviors. Specifically, the abnormal behaviors include modifying, deleting, or otherwise accessing data in one of the data stores, where the circumstances surrounding the access are unexpected for the classifications of data stored in the data store. The abnormal behaviors may be detected using a predetermined policy defining normal and/or abnormal behaviors with respect to different classifications of data. In addition to or instead of such predetermined policies, new policies may be determined by applying a machine learning engine based on analysis of the data itself and action data from the entire cloud environment using anomaly detection techniques. In a further embodiment, the mitigation actions may be prioritized based on the classifications, i.e., such that certain mitigation actions are prioritized over others and computing resources may be prioritized in order to perform the higher priority mitigation actions before lower priority mitigation actions when necessary (e.g., when insufficient resources are available to perform all mitigation actions at once).

Figure 3:
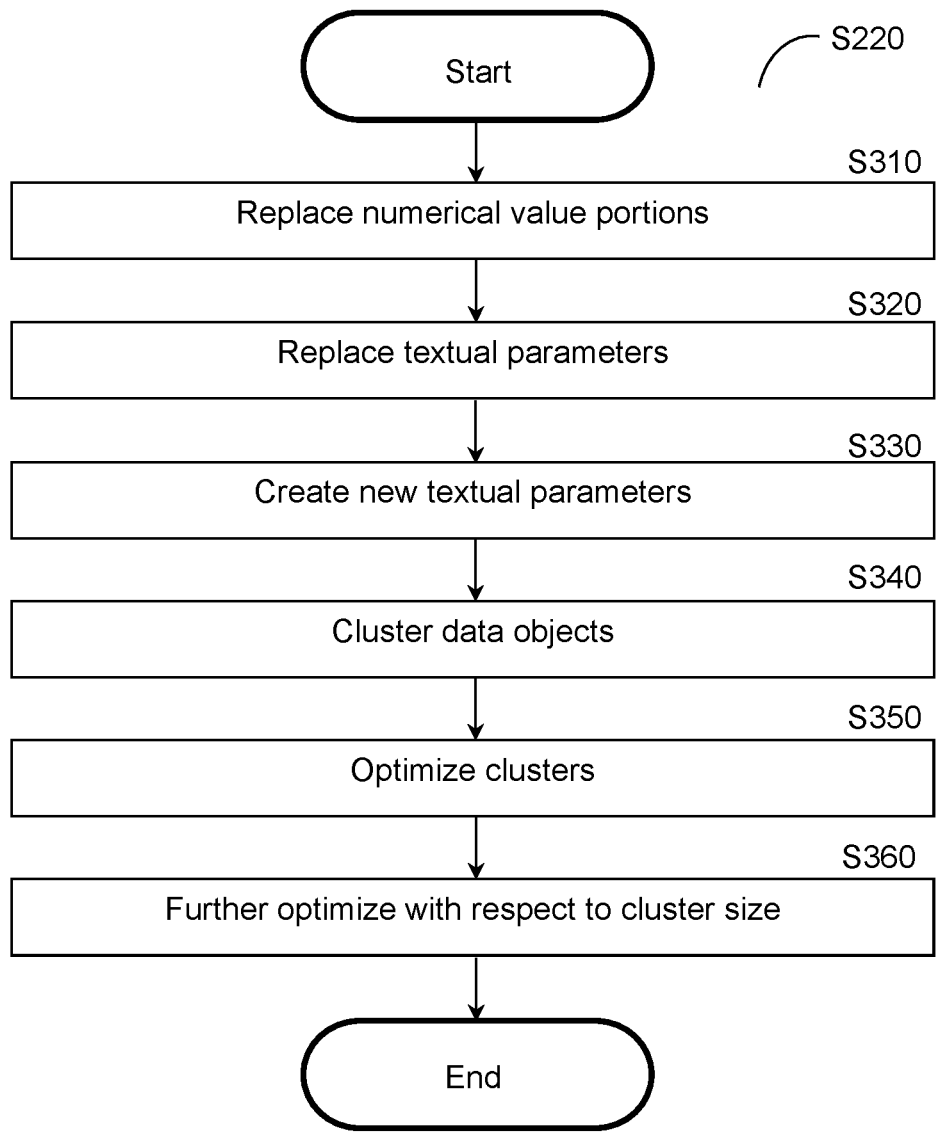
FIG. 3 is a flowchart illustrating a method for clustering data objects according to an embodiment.

FIG. 3 is an example flowchart S220 illustrating a method for clustering data according to an embodiment.

At S310, at least a portion of metadata parameters including numerical values are replaced. In an embodiment, one or more of the numerical values may be replaced with a predefined range. In a further embodiment, the predefined range used to replace a numerical value is a range including the numerical value within the range. As a non-limiting example, predefined ranges for file size could be 1024-2048 bytes and 2048-4096 bytes such that a metadata parameter including with a file size value of 1223 bytes would be replaced with the range 1024-2048 (i.e., since the range 1024-2048 includes the value 1223).

At S320, one or more textual parameters of the metadata (e.g., file path, name, etc.) are replaced with replacement parameters. The replacement parameters may represent the original textual parameter of the given data object and any other original textual parameters of other data objects that demonstrate the same patterns. To this end, certain predefined patterns within the textual parameters of the data object are replaced with respective sets of predefined replacement characters. In an embodiment, different sets of replacement characters are used to replace different types of patterns. By using some sets of replacement characters to replace only certain types of patterns and other replacement characters to replace other types of patterns, each set of replacement characters may be mapped to one or more predefined patterns such that textual parameters reflecting those parameters may be replaced with sets of replacement characters that may be generalized to multiple potential predefined patterns. The textual parameters may be expressed as sets of characters which may include, but are not limited to, letters, numbers, symbols, or other characters.

The sets of replacement characters may be defined so as to replace portions of textual parameters in a one-to-one relationship (e.g., replacing each character in the original parameter with a corresponding character of a set of replacement characters) or in a relationship that is not one-to-one (e.g., replacing characters or sets of characters in the original parameter with a corresponding set of replacement characters which is smaller or larger than the set of characters being replaced).

In an embodiment, S320 includes applying replacement rules defining types of patterns whose characters should be replaced, how to replace the characters of those types of patterns, and which replacement characters should be used for replacement for each of the types of patterns. The types of patterns to be replaced may be defined with respect to types of characters which are typically present in textual parameters of data objects, typical formats of those textual parameters, both, and the like. To this end, the types of patterns to be replaced may be defined as a series of regular expressions based on commonly appearing patterns such as known forms of identifiers, dates, network addresses (e.g., IP addresses), sequences of numbers and/or letters, combinations thereof, and the like.

The replacement rules may further define specific keywords in one or more formats which relate to certain types of patterns such as, but not limited to, months (e.g., months expressed like "Jan" or "January"), directions (e.g., east, west, central, etc.), and the like. In some embodiments, the replacement rules may further define blacklists of keywords which should not be recognized to be replaced via a specific replacement rule. Further, different blacklists may be utilized for different types of replacement rules.

Various non-limiting examples for replacing parameters with replacement characters follow.

As a first non-limiting example, the replacement rules may define Global unique identifiers (UIDs) as having a format such as "cccccccc-cccc-cccc-cccc-cccccccccccc", where "c" is either a letter among characters a-f or A-F or a digit character (a series of 8 letter or digit characters followed by a hyphen, then 4 more characters, hyphen, 4 more characters, hyphen, 4 more characters, hyphen, and finally 12 more characters). The replacement rules may further require that all letter and digit characters within any textual parameters of the data object matching this format be replaced with a replacement character "@" such that the resulting replaced string is "@@@@@@@@-@@@@-@@@@-@@@@-@@@@@@@@@@@@". Consequently, all partial strings in the textual parameter of the data object that are matching this format, will appear as "@@@@@@@@-@@@@-@@@@-@@@@-@@@@@@@@@@@@" when replaced with replaced strings.

As a second example, the replacement rules may define numerically expressed dates as having one of the following formats where "#" is a digit character:
-#-##
.##.####
##

Additional variations of these formats may be defined, particularly based on variations in the number of digits used to express certain parts of the date (for example, using 2 digits to represent a year as "22" instead of 4 digits as "2022" or accounting for dates which may be expressed using either a single digit or two digits such as "1" or "01"). In the second example, the replacement rules may further require that all digit characters within any strings matching one of these formats be replaced with a replacement character "+" or a set of multiple replacement characters "++" (e.g., including a second "+" as padding) such that the resulting replaced strings look like any of:
++-+-++++
++.++.++++
++++++++

As a third example, an IP address may be defined as having the format of 1-3 digits, dot, 1-3 digits, dot, 1-3 digits, dot 1-3 digits. For example, the format may include "###.##.#.#", where "#" is a digit character. The replacement rules may require that the digit characters be replaced with "^", "^^" or "^^^" (e.g., using additional instances of "^" beyond the first as padding in order to further generalize the resulting replaced metadata parameter to accommodate potential minor variations in IP address format for different IP addresses) such that the resulting replaced string for IP addresses is "^^^.^^^.^^^.^^^".

As a fourth example, a digit sequence may be defined as being a string of adjacent digits over a threshold length e.g., "##############", where "#" is a digit character. The replacement rules may require that the digit characters be replaced with "&" such that the resulting replaced string for "##############" is "&&&&&&&&&&&&&&".

As a fifth example, a hexadecimal sequence may be defined as being a string of adjacent letters among a-f or A-F and/or digits over a threshold length (e.g., "cccccccccc"), where "c" is a letter or digit character. The replacement rules may require that the characters be replaced with "$" such that the resulting replaced string for "cccccccccc" is "$$$$$$$$$$".

As a sixth example, the replacement rules may define dates as combinations of letters and digits having one of the following formats, where "#" is a digit character and "L" is a letter character that represents a letter of a month:
LLL
LLLLL ####
LLLLL
LLLL #

Additional variations of these formats may be defined, particularly based on variations in the number of digits used to express certain parts of the date (for example, using 2 digits to represent a year as "22" instead of 4 digits as "2022" or using shortened versions of months such as "Jan" as opposed to the full version "January"). In the sixth example, the replacement rules may further require that all digit characters within any partial strings in the textual parameter of the data object that are matching one of these formats be replaced with a replacement character "Z" or "ZZ" (e.g., with an extra "Z" as padding) and that any combinations of letter characters that collectively represent a month (e.g., a predefined month represented in a dictionary) be replaced with a replacement string of characters "Month" such that the resulting replaced strings look like any of:
ZZMonth
MonthZZZZ
ZZZZMonth
MonthZZ As a seventh example, a random sequence may be defined as being a string of adjacent letters and/or digits over a threshold length that is not meaningful (e.g., "cccccccccc", where "c" is a letter or digit character) according to one or more other replacement criteria. As a non-limiting example, a series of characters above a threshold length that is not defined in a dictionary or otherwise does not meet any other replacement criteria for selecting which portions of metadata parameters to be replaced may be determined as a meaningless sequence of characters, and replacement rules may include rules for replacing characters of such meaningless sequences. The replacement rules may require that the characters of a meaningless sequence of characters be replaced with "#" such that the resulting replaced string for "cccccccccc" is "##########" when "cccccccccc" does not meet any other replacement criteria.

Such meaningless sequences may be generated randomly by a computer program and are not readable or otherwise do not represent real language. As a non-limiting example, the following strings may have been randomly generated by a computer program and identified as meaningless sequences of characters:
W3cdFdc8T
tGvD7wU4s In a further embodiment, a replacement rule for replacing meaningless sequences may utilize entropy with respect to one or more known languages in order to estimate the likelihood that a given string is meaningful in those languages. As a non-limiting example, the string "cloud2022Environment" is likely to be meaningful in the English language due to having at least a threshold number of vowels and/or based on one or more other criteria defined with respect to entropy as compared to other known English words.

It should be noted that these example replaced strings demonstrate replacement of individual types of patterns (i.e., one pattern being replaced per example), but that the disclosed embodiments are not necessarily limited to such an implementation. Multiple types of patterns may appear within a given textual parameter of a data object and multiple replacements may be performed to create any given replaced textual parameter. As a non-limiting example, consider those 2 file paths as textual parameter of 2 different files:

cloudEnvironment\192.168.1.1\1Jan-
logs\a6f43cb3e\example_W3cdFdc8T.txt
cloudEnvironment\192.168.1.10\10Jan-
logs\4ed9a3311\example_tGvD7wU4s.txt The resulting replaced textual parameter for both of those textual parameters may be the following, with the same replaced textual parameter being the result of replacing characters in both of the file path textual parameters:

cloudEnvironment\^^^.^^^.^^^.^^^\ZZMonth-
logs\$$$$$$$$$\example_#########.txt

It should be noted that S310 and S320 are depicted in a particular order merely for example purposes, and that these steps may be performed in a different order or in parallel without departing from the scope of the disclosure. Additionally, other types of replacements may be performed in addition to or instead of either of S310 or S320 without departing from the scope of the disclosed embodiments. Further, in some implementations, only numerical values or only textual parameters may be replaced. The rules for replacing different types of parameters (e.g., numerical or textual metadata parameters) may define different criteria for identifying parameters to be replaced such that different criteria may be used for different types of parameters.

At S330, one or more new textual parameters are created based on the replaced textual parameters created at S320. In an embodiment, the replaced textual parameters are split into substrings based on one or more separators (such as, but not limited to, spaces, tabs, hyphens, slashes, sequences of letters that each start with a capital letter and followed by lowercase letters, etc.). As a non-limiting example, consider the following replaced textual parameter:

cloudEnvironment\PlanningForNextYear\$$$$$$$$$\
report_final_##########

In an example implementation, the resulting list of substrings would be:

[cloud, environment, planning, for, next, year, $$$$$$$$$, report, final, ##########]

The resulting list of separable strings is compared against a dictionary (e.g., a dictionary containing a list of known words in English) in order to identify words whose grammatical category is either noun or verb and filtering out any substrings which do not contain words which are indicated in the dictionary as being either a noun or a verb. For the non-limiting example resulting list of substrings above, the resulting list of separable strings representing noun and verb words might be:

[cloud, environment, planning, year, report]

The result is a filtered list of words that exist in the replaced textual parameters, while substrings that are not an English word or whose grammatical category is adverb or adjective are filtered out of the list.

At S340, the data objects are clustered based on the results of any or all of S310 through S330. As a non-limiting example, consider the following metadata parameters of data objects:

TABLE 1

| file path | file size | is encrypted |
|---|---|---|
| example-3674/forTesting.txt | 1124 | 1 |
| example-5135/forTesting.txt | 1232 | 1 |
| example-9127/securityDocument.txt | 1321 | 1 |
| example-4683/forTesting.txt | 1413 | 0 |

In the non-limiting example illustrated in Table 1, the data objects are files and the metadata parameters include file path, file size, and encryption state ("is encrypted"). Further, the file path is a textual metadata parameter, and the file size and encryption state are numerical metadata parameters. The predefined ranges for file size are 1024-2048 bytes and 2048-4096 bytes, and the predefined range for the encryption state are 0 and 1 (where 1 indicates that the data object is encrypted and 0 indicates that the data object is not encrypted).

In an example implementation, the resulting replaced metadata parameters of those data objects might be:

TABLE 2

| replaced file path | filtered word list of the replaced file path | replaced file size range | replaced encrypted range |
|---|---|---|---|
| example-&&&&/forTesting.txt | [example, testing, txt] | 1024-2048 | 1 |
| example-&&&&/forTesting.txt | [example, testing, txt] | 1024-2048 | 1 |
| example-&&&&/securityDocument.txt | [example, security, document, txt] | 1024-2048 | 1 |
| example-&&&&/forTesting.txt | [example, testing, txt] | 1024-2048 | 0 |

Each row in Table 2 represents a respective data object and includes information related to the replaced metadata parameter of that data object. More specifically, as shown in Table 2, the first two data objects in Table 2 have the same replaced metadata parameters (e.g., same replaced file path, filtered word list of the replaced file path, replaced file size range, replaced encrypted range, etc.) and, therefore, they are clustered into the same cluster or group. The fourth data object in Table 2 has a different replaced metadata parameter (i.e., the replaced encrypted range) and, consequently, it falls into a different cluster.

At optional S350, the initial clusters are optimized. More specifically, such optimization may include, but is not limited to, identifying missed replacement operations that could have been performed at S320. To this end, S350 may include, but is not limited to, comparing at least a portion of the replaced metadata parameter for each cluster to metadata parameters such as, but not limited to, other replaced metadata parameters of other clusters of the same type (e.g., other textual parameters, or other parameters of the same more specific type such as file path and file name).

In a further embodiment, when such a comparison yields a determination that the compared parameters match above a threshold (e.g., as defined with respect to number or proportion of matching characters) and that a random sequence in one of the compared parameters does not match a corresponding portion of the other compared parameter (e.g., a portion in the same location relative to the other characters in each compared parameter), then it may be determined that the non-matching portion of the other compared parameter is also a random sequence. Any random sequence identified in this manner may be accordingly replaced with a set of replacement characters. In yet a further embodiment, after any such replacement, the metadata parameters may be clustered again based on the new replaced metadata parameters, thereby optimizing the clustering by allowing for reducing the number of potential clusters and more accurately grouping metadata parameters into these clusters.

As discussed above with respect to S320, the random sequence replacement rule may be based on statistical inference. When such statistical inference is performed, replaced textual parameters containing random sequences may sometimes remain unidentified as random sequences. By comparing replaced textual parameters to other textual parameters (e.g., letter by letter), potential missed random sequences for replacement can be found. As a non-limiting example, consider the two replaced textual parameters:

cloudEnvironment\PlanningForNextYear\$$$$$$$$$\
report_final_#
cloudEnvironment\PlanningForNextYear\$$$$$$$$$\
report_final_Def1Tag4k The replaced textual parameters match with the exception of the portion following the last backslash (i.e., "report_final_#########" in the first parameter and "report_final_Def1Tag4k" in the second parameter). In the first replaced textual parameter, a portion of this section was identified as random sequence and replaced accordingly with a sequence of "#". In this example, no portion of this section in the second replaced textual parameter was identified as a random sequence via the statistical tests at S320. By comparing the first replaced textual parameter shown above (which has a string of "#" representing a random sequence) to the second replaced textual parameter, it is determined that the portion "Def1Tag4k" in the second replaced textual parameter is also a random sequence to be replaced.

As noted above, the optimization may include comparing each replaced textual parameter to any other replaced textual parameter. If such comparison yields a determination that there is an otherwise identical replaced textual parameter that defers from a replaced textual parameter by at least one portion corresponding to a random sequence in one of the replaced textual parameters (e.g., as marked by a sequence of "#" as per the above non-limiting examples), then the corresponding section in the other replaced textual parameter may be replaced with a random sequence (e.g., a sequence of "#"). For the non-limiting example, the second replaced textual parameter above might become:

cloudEnvironment\PlanningForNextYear\$$$$$$$$$\
report_final_##########

As it is highly desirable that the time complexity of this optimization would be less than polynomial, in an embodiment, all of the replaced textual parameters are sorted by their string length and then by their characters. In a further embodiment, each replaced textual parameter is compared only to the previous replaced textual parameter in the sorted list of replaced textual parameters. In yet a further embodiment, when it is found that the current replaced textual parameter should be replaced, it is replaced before continuing to the next replaced textual parameter.

As a non-limiting example consider the following 3 replaced textual parameters:

++.++.++++-roadmapForManagement/f7rEw3rt
++.++.++++-roadmapForManagement/#########
++.++.++++-roadmapForManagement/2gKehU91

In this non-limiting example, the set of "#" characters is a replaced set of characters used to replace random strings (i.e., strings which are random sequences of characters) identified via statistical inference, for example as discussed above. The textual parameters may be sorted into the following order:

++.++.++++-roadmapForManagement/#########
++.++.++++-roadmapForManagement/f7rEw3rt
++.++.++++-roadmapForManagement/2gKehU91

In accordance with this order, the second replaced textual parameter is compared to the first replaced textual parameter. Based on the comparison, it is determined that the first and second replaced textual parameters match (e.g., above a threshold number or proportion of characters) except for the portion of each replaced textual parameter following the slash. Because this portion of one of the parameters (i.e., the first replaced textual parameter) has been replaced with a replaced set of characters used for random strings (i.e., "#########"), it is determined that the characters in the corresponding location within the second replaced textual parameter (i.e., "f7rEw3rt") are also a random sequence to be replaced with a set of "#" characters. Accordingly, a portion of the second replaced textual parameter is further replaced with "#########" in order to yield the following updated list of replaced textual parameters:

++.++.++++-roadmapForManagement/f7rEw3rt
++.++.++++-roadmapForManagement/#########
++.++.++++-roadmapForManagement/2gKehU91

When the second replaced textual parameter has been replaced in this manner, the third replaced textual parameter is compared to the updated second replaced textual parameter. In this non-limiting example, it is determined that the second and third replaced textual parameters match above a threshold and that the portion of the third replaced textual parameter "2gKehU91" corresponds to the random sequence in the second replaced textual parameter that has been replaced with "#########" such that "2gKehU91" is determined to also be a random sequence and replaced accordingly. After the replacement, the list is updated as follows:

++.++.++++-roadmapForManagement/#########
++.++.++++-roadmapForManagement/#########
++.++.++++-roadmapForManagement/#########

Consequently, the 3 previously different replaced textual parameters are determined to actually be of the same format and therefore may be clustered into the same cluster, thereby reducing the number of potential clusters by eliminating the pre-optimization versions of the file paths of the second and third replaced textual parameters as potential clusters, which in turn optimizes clustering. The optimized clustering, in turn, may reduce subsequent processing and allow for more accurate grouping of data objects.

At optional S360, clusters are further optimized with respect to cluster size. Each cluster size may be determined as the number of data objects having the same replaced parameters (i.e., the number of data objects that are in the same cluster). Clusters with a cluster size less than a predetermined threshold may be determined to be small. In an embodiment, when a cluster is determined to be small, one or more of the replaced textual parameters of the cluster are each replaced with a respective filtered word list parameter (e.g., a parameter representing a filtered word list determined for a textual parameter such as file path, for example as described further above). That way, small clusters could be joined together by their filtered word list parameters while the original replaced textual parameter is no longer taken into account.

As a non-limiting example, consider the following table demonstrating a set of metadata parameters for two data objects as well as a cluster size defined as a number of data objects having the respective set of metadata parameters in each row:

TABLE 3

| replaced file path | filtered word list | replaced file size range | replaced is encrypted range | cluster size |
|---|---|---|---|---|
| example-&&&&/forTesting-final.txt | [example, testing, txt] | 1024-2048 | 1 | 1 |
| example-&&&&/forTesting.txt | [example, testing, txt] | 1024-2048 | 1 | 1 |

As shown in Table 3, the cluster size of both clusters is 1. When the threshold used for determining small cluster size is greater than 1, each of these clusters would be determined as small. In this non-limiting example, the file path textual parameters for these small clusters may be replaced with their respective filtered word lists in order to result in the following:

TABLE 4

| replaced file path | filtered word list | replaced file size range | replaced is encrypted range | cluster size |
|---|---|---|---|---|
| [example, testing, txt] | [example, testing, txt] | 1024-2048 | 1 | 1 |
| [example, testing, txt] | [example, testing, txt] | 1024-2048 | 1 | 1 |

After such replacement, the set of metadata parameters for each of the data objects matches such that the data objects are clustered into the same cluster, thereby optimizing the clusters by reducing the total number of clusters.

It should be noted that FIG. 3 depicts multiple clustering steps, but that at least some disclosed embodiments may only use some of these clustering steps. Further, the clustering steps of FIG. 3 are depicted in a particular order for illustrative purposes, but at least some disclosed embodiments are not limited to the order depicted in FIG. 3.

Figure 4:
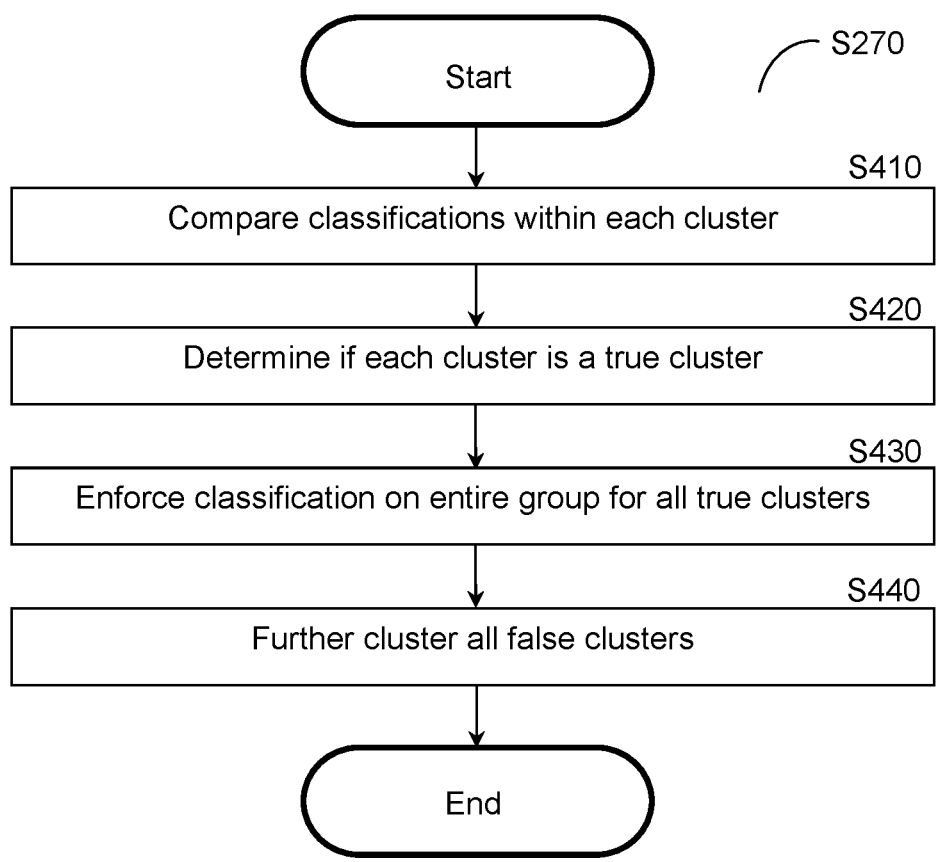
FIG. 4 is a flowchart illustrating a method for aggregating results of classification according to an embodiment.

FIG. 4 is an example flowchart S270 illustrating a method for aggregating classification results according to an embodiment.

At S410, classifications within each cluster are compared. More specifically, as noted above with respect to S240-S260, classifications are determined for each sample taken from each of the clusters. The classifications of different samples within each cluster are compared in order to determine whether the samples in a given cluster can be generalizable according to a predefined set of generalization rules. As a non-limiting example, employee full name and customer full name could be generalized to full name, and postal code could be generalized to address. To this end, the generalization rules may define formats, values, combinations thereof, and the like, which are to be classified into certain predefined generalized classifications.

In an embodiment, the generalization rules may be defined such that, when applied, it may be determined whether the samples in a given cluster belong to one of the following generalized types of classifications.

A first generalized classification type includes classes defined manually as part of a major class. As non-limiting examples, zip code can be considered as or otherwise generalized to a classification representing an address, password can be considered as or otherwise generalized to a classification representing credentials, and the like.

A second generalized classification type includes classes which exclude geo location. As a non-limiting example, EU phone number and US phone number are both can be considered as or otherwise generalized to a classification representing a phone number.

A third generalized classification type includes classes which exclude role. As a non-limiting example, employee full name and customer full name can both be considered as or otherwise generalized to a classification representing a full name.

A fourth generalized classification type includes classes in which encrypted and hashed content are both classified as encrypted. As a non-limiting example, hashed password can be considered as or otherwise generalized to a classification representing an encrypted password.

A fifth generalized classification type includes classes in truncated and masked dated are both classified as masked. As a non-limiting example, a truncated credit card number (e.g., 1234 as the last 4 digits of a credit card number) can be considered as or otherwise generalized to a classification representing a masked credit card number (e.g., ******-1234).

At S420, it is determined whether each cluster is a true cluster or not (e.g., that the cluster is a false cluster). In an embodiment, for each cluster, the classifications of the samples are compared (e.g., the generalized classifications determined at S410 or otherwise the classifications of the samples). For differences between the samples' classifications, a likelihood of the differences being due to a false positive classification is computed. In an embodiment, when it is determined that differences in the samples' classifications are likely to be due to false positives of the classification process (e.g., if the computed likelihood of the differences being due to a false positive classification is above a predetermined threshold), a specific classification is eliminated and the cluster is marked as a true cluster. If differences between generalized classifications of samples of a given cluster could not be settled, the assumption about the cluster is contradictory and the cluster would be marked as false cluster.

The differences may be defined, for example, with respect to recognizers, which are portions of data used that, either individually or in combination, may be indicative of a particular classification (e.g., classifications such as "full name", "address", "phone number", "credit card number", "invoice", and the like). For each recognizer, an accuracy of its results may be computed as the percentage of how many times the recognizer was correct (e.g., the number of times in which the recognizer was identified and used to determine a particular classification, and that classification ended up being the correct classification). More specifically, by assuming that each cluster is a true cluster (i.e., assuming that the cluster should have been classified according to the determined classifications), a probability that sample files from the same cluster got different classifications due to mistakes of the recognizers (false positives) may be computed. When the probability is very low (e.g., below a threshold), then the likelihood of differences being due to false positives may be determined to be very low and, accordingly, the cluster is determined not to be a true cluster; otherwise (i.e., when the probability is above the threshold), the cluster is determined to be a true cluster and classifications from a majority of the samples may be enforced on the other samples and data (e.g., files) of the cluster.

As a non-limiting example, consider the following table including identifiers and classifications corresponding to respective data objects.

TABLE 5

| cluster id | file id | file classifications of the file | generalized classification of the file |
|---|---|---|---|
| 1 | 1 | [employee phone number, address] | [phone number, address] |
| 1 | 2 | [customer phone number, address] | [phone number, address] |
| 1 | 3 | [phone number, full name, postal code] | [phone number, full name, address] |
| 2 | 4 | [employee phone number, address] | [phone number, address] |
| 2 | 5 | [customer phone number, address] | [phone number, address] |
| 2 | 6 | [phone number, credit card number, postal code] | [phone number, credit card number, address] |

As shown in Table 5, there are 2 clusters with 3 sample files as data objects in each cluster. Each sample file has its own classifications. In the non-limiting example shown in Table 5, the classification of each sample file was generalized (e.g., as discussed above with respect to S410) such that some of the generalized classifications of the sample files are identical to the generalized classification of other sample files in the same cluster.

Within each cluster represented in Table 5, there is a discrepancy between some of the generalized classifications. Such discrepancies are as follows:

TABLE 6

| cluster id | differences to be settled | the likelihood of the differences to be due to a false positive case | decision | final classifications of true cluster |
|---|---|---|---|---|
| 1 | [full name] | high | true cluster | [phone number, address] |
| 2 | [credit card number] | low | false cluster | |

As shown in Table 6, a decision about each cluster has been made after considering the differences between the classifications of the samples. Note that, in an example implementation, when there are no differences between the samples' classifications, the cluster is determined to be a true cluster. For the difference "full name" of the first cluster, it is determined that there is a high likelihood that the difference is due to a false positive and, therefore, the cluster is determined to be a true cluster. Accordingly, a final classification for the first cluster is determined with respect to the generalized classification "[phone number, address]" (i.e., the generalized classification without the difference. For the second cluster, the likelihood is determined to be low such that the second cluster is determined to be a false cluster.

Alternatively or additionally, true clusters may be identified based on schematic structures of samples. As a non-limiting example, data objects that are invoice documents may have the same schematic structure. The structure of a data object may be defined with respect to factors such as, but not limited to, regular expressions. In some embodiments, samples within a cluster may be compared to each other (e.g., letter by letter or otherwise character by character) to determine a degree of similarity between the compared samples. In a further embodiment, when samples among a cluster are determined to be highly similar (e.g., above a predetermined threshold degree of similarity), the cluster may either be determined to be a true cluster or the high similarity among samples may be utilized in the computation of the likelihood that the differences are due to a false positive (e.g., such that clusters with highly similar samples are computed to have higher likelihoods on average than clusters without highly similar samples).

At S430, for each true cluster, the final classifications determined at S420 are enforced on the entire cluster of data objects. More specifically, in some embodiments, the final classifications may be enforced without classifying the data objects within each true cluster. In other words, the final classification for each true cluster may be determined as the classification for all data objects in the true cluster without requiring classifying every data object in the true cluster.

At S440, false clusters are further clustered internally. In an embodiment, each false cluster is split into multiple sub-clusters with respect to similarities and differences among the metadata parameters and classifications of samples within each cluster. The resulting sub-clusters may be used as clusters for subsequent processing. In some embodiments, the resulting sub-clusters may be processed as described above with respect to any of S230 through S260.

As a non-limiting example for splitting a false cluster into multiple sub-clusters, metadata of samples having phone numbers may all include recent dates (e.g., within the past 30 days), while samples lacking phone numbers may all include older dates (e.g., more than 30 days old). Based on the similarities within each group of samples and the difference compared to the other group of samples, it is determined to split the cluster with respect to whether they include phone numbers or not (i.e., such that the resulting sub-clusters include a subgroup of samples having phone numbers and a subgroup lacking phone numbers).

In some embodiments, the splitting may be performed up to a predefined threshold number of splitting iterations, until a predefined number of data objects remain in the cluster to be split, both, and the like. Any false clusters that have been split up until the applicable threshold or thresholds have been reached may be split into a sub-cluster for each data object (i.e., sub-clusters of 1 data object each).

The splitting of the false clusters with respect to similarities and differences in classifications of the samples provides additional granularity of clustering which may remediate any clustering errors which occurred by clustering only with respect to the metadata parameters. This, in turn, allows for utilizing such clustering to reduce subsequent processing while further maintaining accuracy of subsequent classification.

Figure 5:
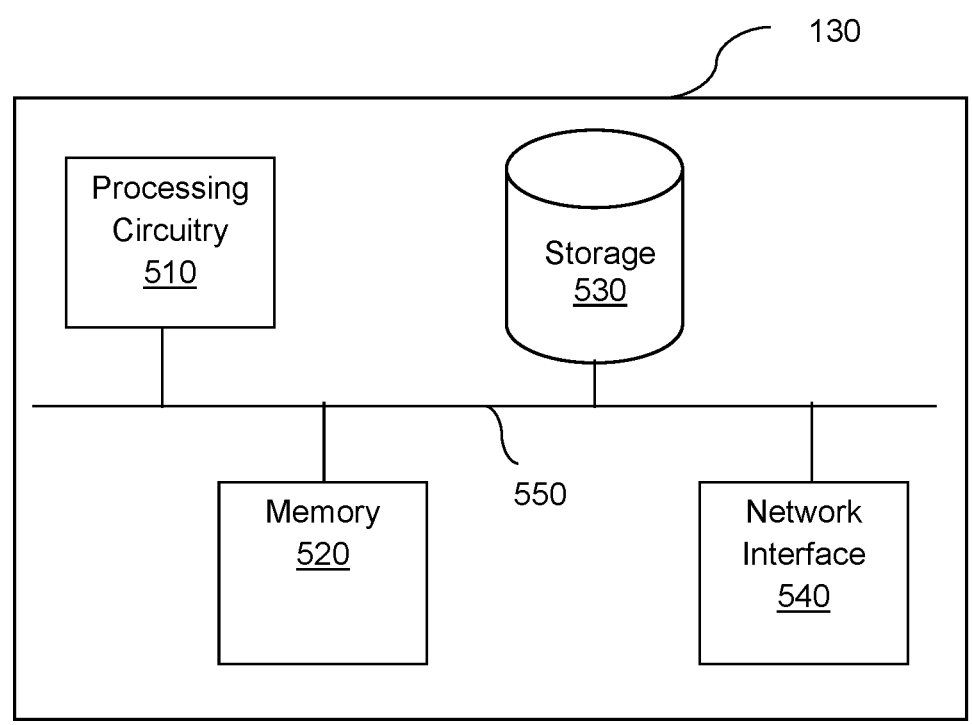
FIG. 5 is a schematic diagram of a data classifier according to an embodiment.

FIG. 5 is an example schematic diagram of a classification system 130 according to an embodiment. The classification system 130 includes a processing circuitry 510 coupled to a memory 520, a storage 530, and a network interface 540. In an embodiment, the components of the classification system 130 may be communicatively connected via a bus 550.

The processing circuitry 510 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 520 may be volatile (e.g., random access memory, etc.), non-volatile (e.g., read only memory, flash memory, etc.), or a combination thereof.

In one configuration, software for implementing one or more embodiments disclosed herein may be stored in the storage 530. In another configuration, the memory 520 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 510, cause the processing circuitry 510 to perform the various processes described herein.

The storage 530 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 540 allows the classification system 130 to communicate with, for example, the cloud environment 120 (particularly, the disks 125 and the copy disks C125 in the cloud environment 120).

It should be understood that the embodiments described herein are not limited to the specific architecture illustrated in FIG. 5, and other architectures may be equally used without departing from the scope of the disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for data classification using clustering, comprising:
    replacing a plurality of portions of metadata for a plurality of data objects with a plurality of replacement characters in order to generate a plurality of replaced strings;
    clustering the plurality of data objects into a plurality of clusters based on commonalities between the plurality of replaced strings of data objects of the plurality of data objects, wherein clustering the plurality of data objects into a plurality of clusters further comprises optimizing the plurality of clusters based on cluster size by identifying at least one cluster having a cluster size below a threshold and replacing at least one textual parameter of each cluster having a cluster size below a threshold with a respective list of words identified within the textual parameter;
    classifying a subset of the data objects in each cluster into at least one class; and
    aggregating classes within at least one cluster of the plurality of clusters, wherein aggregating classes within each of the at least one cluster includes applying the at least one class for the subset of the data objects in each cluster to each other data object within the cluster.

2. The method of claim 1, wherein the metadata for each data object includes a plurality of metadata parameters, wherein the plurality of data objects is clustered into the plurality of clusters based on the plurality of metadata parameters of each data object.

3. The method of claim 2, wherein the plurality of data objects is clustered over a plurality of iterations, wherein at least one iteration of the plurality of iterations includes comparing the sets of metadata parameters between clusters.

4. The method of claim 3, wherein the at least one iteration further includes replacing at least one metadata parameter of at least one of the plurality of data objects, wherein subsequent iterations of the plurality of iterations are performed based on replaced metadata parameters from prior iterations of the plurality of iterations.

5. The method of claim 1, wherein each of at least one first replaced portion of the replaced plurality of portions is a numerical value, wherein each of the at least one first replaced portion is replaced with a respective range including the numerical value.

6. The method of claim 1, wherein each of at least one second replaced portion of the replaced plurality of portions is a textual parameter, wherein each of the at least one second replaced portion demonstrates a pattern and is replaced with a set of predefined replacement characters that corresponds to the pattern.

7. The method of claim 1, wherein each of at least one third replaced portion of the replaced plurality of portions is a textual parameter, further comprising:
splitting each of the at least one third replaced portion into a plurality of substrings, wherein the plurality of data objects is clustered based further on each plurality of substrings.

8. The method of claim 7, further comprising:
filtering out at least one substring from the plurality of substrings in order to yield at least one filtered of substrings, wherein the clustering is performed based further on the at least one filtered list of substrings.

9. The method of claim 1, clustering the plurality of data objects into a plurality of clusters further comprises:
optimizing the plurality of clusters based on at least one random sequence identified in the metadata of the plurality of data objects, wherein each random sequence is a string of characters having a length over a predetermined threshold which does not meet at least one replacement criterion.

10. The method of claim 1, further comprising:
sampling each of the plurality of clusters in order to obtain a plurality of samples, wherein each sample is one of the data objects in one of the plurality of clusters; and
determining the at least one cluster for which classes are to be aggregated based on the plurality of samples.

11. The method of claim 1, further comprising:
performing at least one action to secure a computing environment including the plurality of data objects based on the classes determined for the plurality of data objects.

12. A non-transitory computer readable medium having stored thereon instructions for causing a processing circuitry to execute a process, the process comprising:
replacing a plurality of portions of metadata for a plurality of data objects with a plurality of replacement characters in order to generate a plurality of replaced strings;
clustering the plurality of data objects into a plurality of clusters based on commonalities between the plurality of replaced strings of data objects of the plurality of data objects, wherein clustering the plurality of data objects into a plurality of clusters further comprises optimizing the plurality of clusters based on cluster size by identifying at least one cluster having a cluster size below a threshold and replacing at least one textual parameter of each cluster having a cluster size below a threshold with a respective list of words identified within the textual parameter;
classifying a subset of the data objects in each cluster into at least one class; and
aggregating classes within at least one cluster of the plurality of clusters, wherein aggregating classes within each of the at least one cluster includes applying the at least one class for the subset of the data objects in each cluster to each other data object within the cluster.

13. A system for classifying data in cloud computing environments, comprising:
a processing circuitry; and
a memory, the memory containing instructions that, when executed by the processing circuitry, configure the system to:
replace a plurality of portions of metadata for a plurality of data objects with a plurality of replacement characters in order to generate a plurality of replaced strings;
cluster the plurality of data objects into a plurality of clusters based on commonalities between the plurality of replaced strings of data objects of the plurality of data objects, wherein the system is further configured to optimize the plurality of clusters based on cluster size by identifying at least one cluster having a cluster size below a threshold and replacing at least one textual parameter of each cluster having a cluster size below a threshold with a respective list of words identified within the textual parameter;
classify a subset of the data objects in each cluster into at least one class; and
aggregate classes within at least one cluster of the plurality of clusters, wherein aggregating classes within each of the at least one cluster includes applying the at least one class for the subset of the data objects in each cluster to each other data object within the cluster.

14. The system of claim 13, wherein the metadata for each data object includes a plurality of metadata parameters, wherein the plurality of data objects is clustered into the plurality of clusters based on the plurality of metadata parameters of each data object.

15. The system of claim 14, wherein the plurality of data objects is clustered over a plurality of iterations, wherein at least one iteration of the plurality of iterations includes comparing the sets of metadata parameters between clusters.

16. The system of claim 15, wherein the at least one iteration further includes replacing at least one metadata parameter of at least one of the plurality of data objects, wherein subsequent iterations of the plurality of iterations are performed based on replaced metadata parameters from prior iterations of the plurality of iterations.

17. The system of claim 13, wherein each of at least one first replaced portion of the replaced plurality of portions is a numerical value, wherein each of the at least one first replaced portion is replaced with a respective range including the numerical value.

18. The system of claim 13, wherein each of at least one second replaced portion of the replaced plurality of portions is a textual parameter, wherein each of the at least one second replaced portion demonstrates a pattern and is replaced with a set of predefined replacement characters that corresponds to the pattern.

19. The system of claim 13, wherein each of at least one third replaced portion of the replaced plurality of portions is a textual parameter, wherein the system is further configured to:
split each of the at least one third replaced portion into a plurality of substrings, wherein the plurality of data objects is clustered based further on each plurality of substrings.

20. The system of claim 19, wherein the system is further configured to:
filter out at least one substring from the plurality of substrings in order to yield at least one filtered of substrings, wherein the clustering is performed based further on the at least one filtered list of substrings.

21. The system of claim 13, wherein the system is further configured to:
optimize the plurality of clusters based on at least one random sequence identified in the metadata of the plurality of data objects, wherein each random sequence is a string of characters having a length over a predetermined threshold which does not meet at least one replacement criterion.

22. The system of claim 13, wherein the system is further configured to:
sample each of the plurality of clusters in order to obtain a plurality of samples, wherein each sample is one of the data objects in one of the plurality of clusters; and
determine the at least one cluster for which classes are to be aggregated based on the plurality of samples.

23. The system of claim 13, wherein the system is further configured to:
perform at least one action to secure a computing environment including the plurality of data objects based on the classes determined for the plurality of data objects.

* * * * *